(12) United States Patent
Aguilar et al.

(10) Patent No.: US 6,430,687 B1
(45) Date of Patent: Aug. 6, 2002

(54) BOOT SEQUENCE FOR A NETWORK COMPUTER INCLUDING PRIORITIZED SCHEDULING OF BOOT CODE RETRIEVAL

(75) Inventors: Maximino Aguilar; Norbert M. Blam; Michael Edward Criscolo; Sanjay Gupta, all of Austin; John William Gorrell, Jr., Round Rock; Roy Moonseuk Kim, Austin; James Michael Stafford, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/292,192

(22) Filed: Apr. 15, 1999

(51) Int. Cl.[7] .............................. G06F 1/26; G06F 1/30
(52) U.S. Cl. .......................... 713/2; 713/100; 713/300; 710/15
(58) Field of Search .............................. 710/15; 713/1, 713/2, 100, 300

(56) References Cited

U.S. PATENT DOCUMENTS

| | | | | |
|---|---|---|---|---|
| 5,710,931 A | * | 1/1998 | Nakamura et al. | 395/750 |
| 5,758,174 A | * | 5/1998 | Crump et al. | 395/750.05 |
| 5,860,001 A | * | 1/1999 | Cromer et al. | 395/651 |
| 6,272,628 B1 | * | 8/2001 | Aguilar et al. | 713/2 |

* cited by examiner

Primary Examiner—Jeffrey Gaffin
Assistant Examiner—Rehana Perveen
(74) Attorney, Agent, or Firm—Joseph P. Lally; J. Bruce Schelkopf; Casimer K. Salys

(57) ABSTRACT

A computer network that includes a network server and a network client. The network server includes a storage medium configured with boot code data preferably comprising operating system software for the network client. The network client includes a power status indicator and is configured to query the power status indicator as part of a boot code sequence that is initiated in response to a boot event. The network client is configured to schedule retrieval of boot code data from the network server based upon the power status indicator. Preferably, the power status indicator includes a power fail circuit that indicates whether power to the network client has failed since a previous boot event. In one embodiment, the power fail circuit includes a flip flop arranged such that the output of the flip flop is preset when power is restored to the network client after a power failure. Preferably the clear input of the flip flop is programmably assertable. The power status indicator preferably further includes a power mode indicator that conveys information about the last known power mode of the network client. Preferably, the power mode indicator includes at least one nonvolatile memory bit.

25 Claims, 2 Drawing Sheets

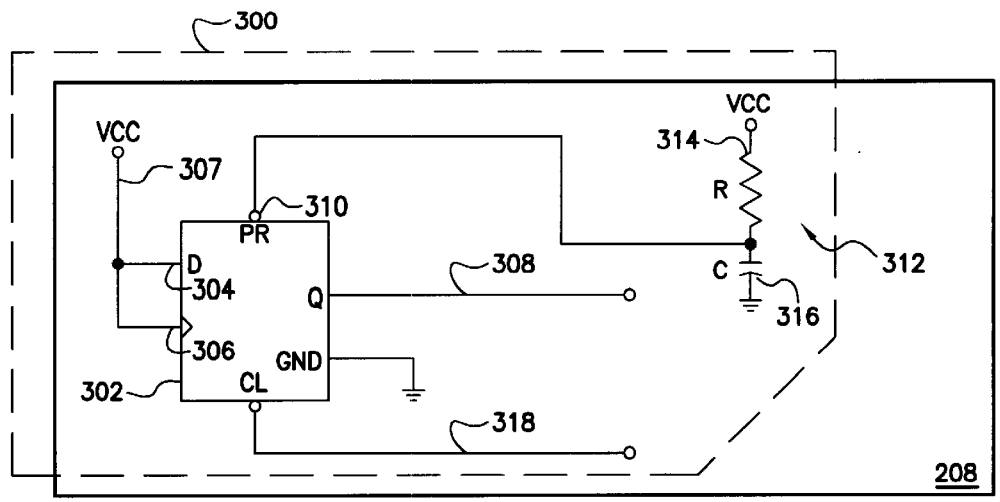
FIG.3
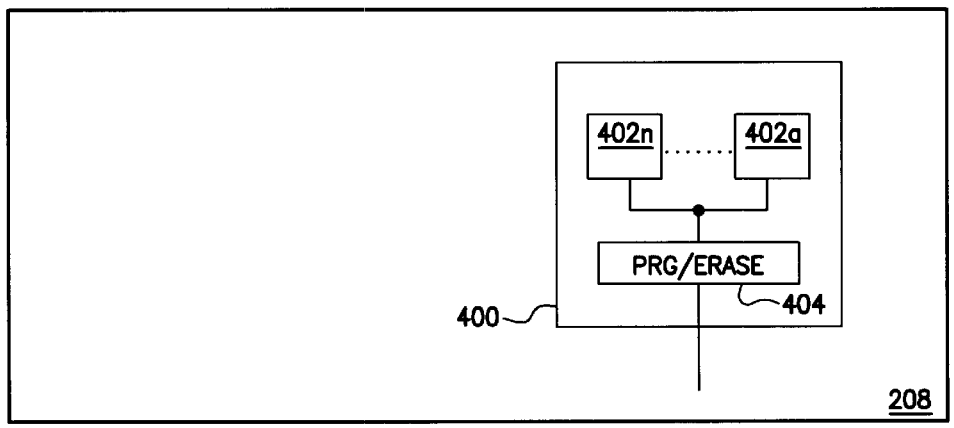
FIG.4
| ENTRY | POWER FAIL INFO | | POWER MODE INDICATOR | | SCHED/PRIORITY |
|---|---|---|---|---|---|
| 1 | 0 | PWR OK | 00 | ON | NO RETRIEVAL SCHEDULED |
| 2 | 0 | | 01 | SUSPEND | NO RETRIEVAL SCHEDULED |
| 3 | 0 | | 10 | SOFT OFF | SCHEDULE RETRIEVAL |
| 4 | 0 | | 11 | FULL OFF | N/A |
| 5 | 1 | PWR FAIL | 00 | ON | SCHEDULE RETRIEVAL |
| 6 | 1 | | 01 | SUSPEND | SCHEDULE RETRIEVAL |
| 7 | 1 | | 10 | SOFT OFF | RETURN TO SOFT OFF |
| 8 | 1 | | 11 | FULL OFF | INITIATE RETRIEVAL |
FIG.5

BOOT SEQUENCE FOR A NETWORK COMPUTER INCLUDING PRIORITIZED SCHEDULING OF BOOT CODE RETRIEVAL

BACKGROUND

1. Field of the Present Invention

The present invention generally relates to computer networks and more particularly to a system and method for initiating computers in a network following a power disruption or failure.

2. History of Related Art

Local area networks provide a desirable computing solution for an increasing number of applications. Manufacturers and designers of network computers have made significant efforts to address this growing market by providing machines designed to maximize network value by carefully controlling the implementation of resources on each computer in the network. In the past, local area networks were frequently designed by interconnecting two or more personal computers, possibly in combination with a large capacity, centralized server machine. The wide spread availability and acceptance of disk based operating system software that eliminated much of the design overhead associated with implementing a local area network greatly contributed to the proliferation of networks comprised of a two or more essentially stand-alone machines. Unfortunately, such networks frequently fail to utilize resources in an optimal fashion and, therefore, do not provide the most cost effective solution to the customer. More specifically, networks comprised simply of a collection of stand alone machines unnecessarily duplicate resources that can be offered via the network and centralized in one or more network servers.

In many applications, for example, significant cost savings can be achieved in a network by eliminating conventional permanent storage devices such as hard disks from some or all of the client machines. Permanent storage in these networks is provided via a centralized server that is shared among each of the network clients. In a wide range of applications, the cost, power consumption, and space savings achieved by eliminating local hard drives from the network can more than compensate for limitations imposed by the lack of local permanent storage. This is particularly true in applications that contemplate relatively rare interruptions in the power supplied to client machines. When power is continuously maintained to a network client, any software, such as operating system software, required to configure and provide basic functionality to the client can be maintained in the client's system memory (i.e., the client's RAM). In this manner, the occasions on which the client is required to retrieve information from the network's permanent storage are greatly reduced and the increased access time associated with retrieving data from a remote server is generally acceptable.

Even in systems in which it is intended to maintain power continuously to each client, however, occasional power interruptions are inevitable. The disruption of power, whether intentional or otherwise, in a computer network that includes multiple diskless client machines can create a problem following the restoration of power as each client machine attempts to restore itself to a functional state. Following an interruption in power, each diskless client must retrieve basic operating system code from the network server before the client can execute application programs. In a conventional network design, each client attempts to retrieve or download the operating system immediately after power is restored. When multiple clients attempt to simultaneously download large quantities of data from the server, the limited bandwidth of the network can quickly become saturated. This saturation can result in an unacceptably slow start up sequence or, worse yet, a system unable to fully restore itself following a power interruption. Accordingly, it is highly desirable to provide a computer network that is able to avoid this "boot storm" phenomenon without significantly requiring an increase in network bandwidth or cost.

SUMMARY OF THE INVENTION

The problems identified above are in large part addressed by a network computer and network client designed to preserve and interpret power status information such that, following a system interruption, the network avoids a condition in which all network clients attempt simultaneously to access and download data from the system server. Broadly speaking, the present invention contemplates a computer network that includes a network server and a network client. The network server includes a storage medium configured with boot code data comprising, in one embodiment, operating system software for the network client. The network client includes a power status indicator and is configured to query the power status indicator as part of a boot code sequence that is initiated in response to a boot event. The network client is further configured to schedule retrieval of boot code data from the network server based upon the power status indicator.

Preferably, the power status indicator includes a power fail circuit that indicates whether power to the network client has failed since a previous boot event. In one embodiment, the power fail circuit includes a flip flop arranged such that the output of the flip flop is preset when power is restored to the network client after a power failure. Preferably the clear (CL) input of the flip flop is programmably assertable. The power status indicator preferably further includes a power mode indicator that conveys information about the last known power mode of the network client. Preferably, the power mode indicator includes at least one nonvolatile memory bit. In the preferred embodiment, the boot code sequence is stored in a nonvolatile storage device of the network client. In one embodiment suitable for minimizing the cost of the computer network, the network client lacks a randomly accessible permanent storage facility.

The present invention still further contemplates a client computer for use in a computer network. The computer includes a power status indicator and a nonvolatile storage device that is configured with instructions comprising a boot code sequence. The client computer is designed to execute the boot code sequence in response to a boot event. The boot code sequence queries the power status indicator and schedules the retrieval of boot code data from a server of the computer network based upon the power status indicator. In the preferred embodiment, the power status indicator includes, a power fail circuit, preferably comprising a flip flop, configured to indicate whether power to the client computer has failed since a previous boot event and a power mode indicator, preferably including one or more nonvolatile memory bits, indicative of a last known power mode of the client computer.

The present invention still further contemplates a method of operating a network client, including executing a boot code sequence in response to a boot event and querying a power status indicator as a portion of the boot code sequence. Thereafter, a retrieval of boot code data from a network server is scheduled based upon the power status indicator. Boot code data is then retrieved from the network server at the scheduled time and stored in a system memory of the network server. The boot event may suitably comprise a LAN wakeup event, a reset event, or a power on event. The querying of the power status indicator, in one embodiment, includes querying a power fail circuit configured to indicate if the network client has experienced a power fail since a previous boot event and clearing the power fail circuit afterwards. In the preferred embodiment, the querying of the power status indicator comprises querying a power mode indicator configured to indicate a last known power mode of the network client. The scheduling of the retrieval may include requesting a prompt from a user of the network client or creating a randomly generated delay interval.

BRIEF DESCRIPTION OF THE DRAWINGS

Other objects and advantages of the invention will become apparent upon reading the following detailed description and upon reference to the accompanying drawings in which:

FIG. 3 is a simplified circuit diagram of a power fail circuit according to the present invention; and FIG. 4 is a simplified block diagram of a power mode indicator according to the present invention.

FIG. 5 is a table representing various power status information entries and their associated boot sequence download scheduling options according to one embodiment of the present invention.

Figure 1:
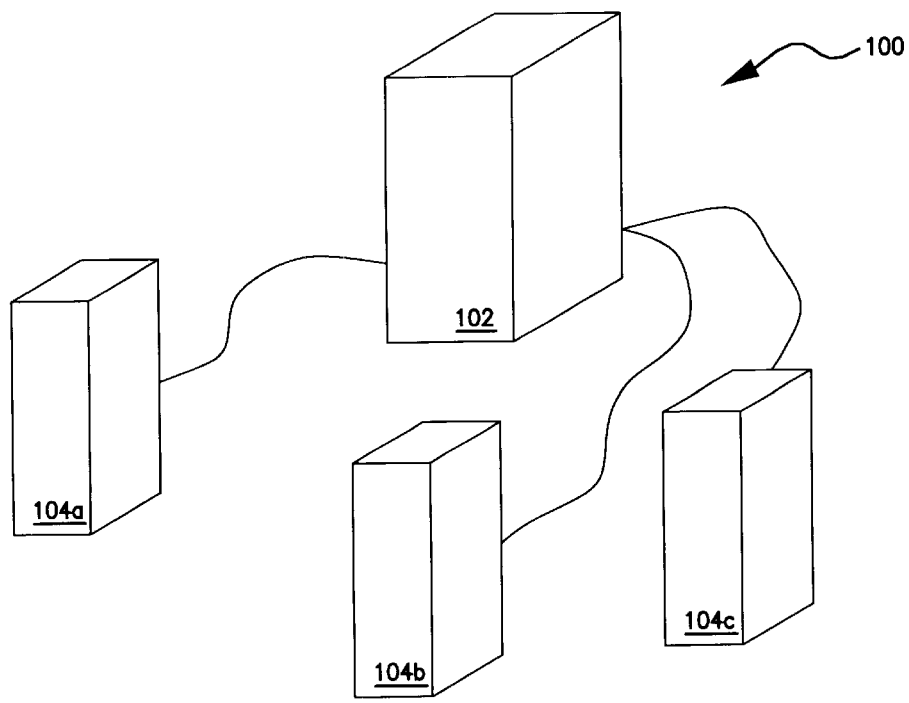
FIG. 1 is diagram of a computer network according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 depicts a computer network 100 according to the present invention. Computer network 100 includes a network server 102 and a plurality of network clients 104 (also referred to herein as client computers 104). The network clients 104 are suitably connected to network server 102 via a transmission medium. In the depicted embodiment, each network client 104 is wired to network server via cabling 105. Although the depicted embodiment shows a network topology in which each client computer 104 is wired directly to network server 102, those skilled in the art of network design will appreciate that any of a variety of network topologies is possible, including topologies (not depicted) in which some network clients 104 access network server 102 through one or more intermediate network clients 104 and topologies in which each network client 104 is coupled to network server 102 through a router, hub, or other suitable network connection device. Another embodiment (not depicted) contemplates a wireless network 100 in which each client computer 104 communicates with network server 102 via signals transmitted through the air. In an embodiment of computer network 100 designed to fully utilize the shared resources enabled by network 100 and to minimize the cost of computer network 100, one or more network client 104 lacks a hard disk or other suitable randomly accessible, read/write, permanent storage facility. In this embodiments, each network client 104 lacking a hard disk utilizes the hard drive of network server 102 for permanent storage of data (where data is intended broadly to include computer code). In still other embodiments, additional cost savings may achieved by eliminating a floppy diskette and/or CD drive from network computer 104.

In the preferred embodiment of computer network 100, it is typically unnecessary to fully power down network clients 104 during normal system operation.* During prolonged periods of inactivity, the preferred embodiments of network client 104 are configured to assume a low power mode to reduce the overall power consumed by computer system 100. In the preferred embodiment, network client can assume one of at least four power mode states. In an ON mode, network client 104 is fully functional and consumes the maximum power. If a client that is in ON mode remains idle (i.e., receives no input via a keyboard, mouse or other input device) from a user of network client 104 or from network server 102 via network 105 for specified duration, network client 104 assumes a SUSPEND state. In the SUSPEND state, various peripheral circuits and I/O facilities of network computer 104 such as the computer's video monitor are powered down until network client 104 detects user input or input from network server 102. For purposes of this disclosure, a defining characteristic of the SUSPEND state is the ability to "wake" network computer 104 from the SUSPEND state without executing a hardware or software boot. In other words, power is maintained to critical facilities of network client 104 to enable operation, in response to an input event such as a keyboard or mouse entry, after waking the I/O and peripheral circuits that were powered down. In the preferred embodiment, network computer 104 is capable of entering a SOFT OFF mode in which power is maintained to only those facilities of network computer 104 necessary to enable client 104 to detect a boot event and to initiate execution of a boot sequence. Whereas power and refresh activity is maintained to the network computer's system memory in SUSPEND sate, power to system memory is disabled in the SOFT OFF state. In embodiments of network client 104 lacking in a hard disk or other suitable permanent read/write storage facility, disabling power to the computer's system memory typically eliminates the network computer's operating system software from the system. Under these circumstances, execution of a boot code sequence is required after a subsequent boot event to restore network computer 104 to full functionality. In the SOFT OFF mode, a boot event that might suitably initiate the boot code sequence includes a LAN wake-up event in which the initiation of the boot code sequence and a user initiated boot event such as depressing a reset button on the chassis of network computer 104. In a FULL OFF mode, all power to network computer 104 is disabled and the computer is incapable of detecting any boot event other than the activation of a power switch located on network computer 104.

* Each network client 104 is designed, in the preferred embodiment to assume one of multiple power mode states.

Figure 2:
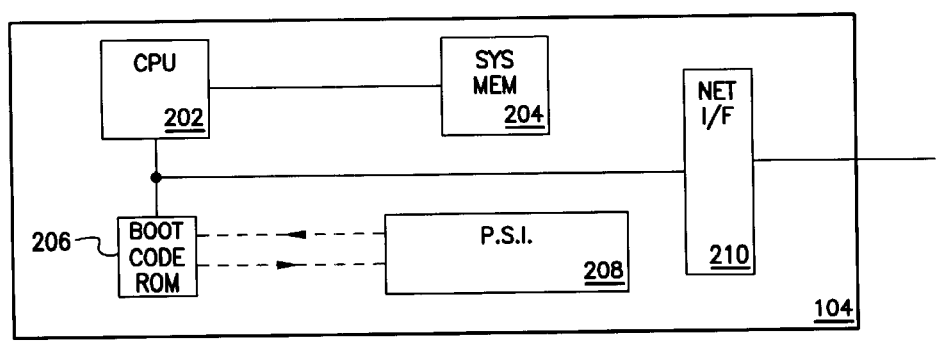
FIG. 2 is a block diagram of a network client computer according to the present invention.

Turning now to FIG. 2, a simplified block diagram of an embodiment of network client 104 according to the present invention is presented. Network client 104 includes one or more central processing units (CPUs) 202 coupled to a system memory 204. CPU 202 may comprise any of a variety of commercially distributed central processing units suitable for executing a sequence of computer instructions and performing arithmetic operations associated with the computer program. Each CPU 202 may incorporate one or more level of cache memory (not shown) useful for storing relatively small portions of system memory 204 in a relatively fast memory to reduce latency associated with accessing system memory 204. The various levels of cache memory may comprise an integrally fabricated portion of CPU 202 or may comprise a discrete device. CPU 202 executes computer instructions that are stored in system memory 204 and fetches and stores data in system memory 204. In a popular arrangement, system memory 204 is implemented with a relatively large array of dynamic random access memory (RAM) devices while each level of cache memory is implemented with a relatively smaller, faster, and more expensive array of static memory devices. Both dynamic and static memory devices are referred to as volatile memory devices to indicate the inability of these devices to retain information when power to the device is disabled. The embodiment of network client 104 according the present invention further includes a boot code storage device 206 and a power status indicator 208. Boot code storage device 206 is preferably implemented as a nonvolatile memory such as a flash memory device and is configured with computer instructions that comprise a boot code sequence. The boot code sequence stored in boot code storage device 206 is initiated in response to a boot event where, as discussed previously, the boot event could be in the form of a LAN wake-up event, the activation of a button on the cabinet, or a keyboard command.

In the preferred embodiment, the boot code sequence includes a routine that queries power status indicator 208. Power status indicator 208, as its name implies, conveys information about the power status of network client 104. The preferred embodiment of power status indicator 208 conveys power fail information and power mode information. The power fail information indicates whether network client 104 has experienced a power failure since an immediately preceding boot event. The power fail information provides a useful indicator of whether system memory 204 of network client 104 has been invalidated by a loss of power. In embodiments of network client 104 lacking a hard disk or other suitable permanent storage facility, the occurrence of a power failure renders network client 104 inoperable by erasing system memory 204, where the operating system software and other critical data reside. Therefore, to return to a state of operability, network client 204 must download data (referred to herein as boot code data) from the hard disk or other permanent storage facility of network server 102. In one embodiment, the boot code data that is retrieved from the network server 102 during execution of the boot code sequence includes the operating system software for network client 104.

The power mode information conveyed by the preferred embodiment of power status indicator 208 is indicative of the last known power mode in which network client 104 was operable. As discussed above, network client 104 can assume any of multiple power modes. The present invention beneficially utilizes the last known power mode of network client 104 conveyed by the power mode information and the power fail information to prioritize or schedule the initiation of any necessary downloading of data from network server 102 during the boot sequence. When the power fail information indicates that network client 104 has experienced a power failure, the power mode information is used in the present invention as a proxy for the conditions under which the power failure occurred. This information is then utilized to prioritize the scheduling of download activity to avoid a "boot storm" scenario in which each network client 104 automatically initiates a download from network server 102 when power is restored after a power failure thereby causing massive congestion on the network. In embodiments of computer 100 in which one or more network clients 104 lack a hard drive, each such network client 104 is typically required to download an entire operating system after a power failure. If all of these network clients simultaneously initiate a download of a large block of data such as an operating system, the network may lack sufficient bandwidth to efficiently service each of the download requests thereby potentially resulting in erroneous or degraded performance.

Turning now to FIG. 3, an embodiment of power status indicator 208 is depicted in which the power fail information is conveyed by a power fail circuit 300. Power fail circuit 300 includes a flip flop 302 configured such that an output Q 308 of flip flop 302 indicates whether a power failure has occurred. More specifically, flip flop 302 is arranged in the depicted embodiment such that output Q 308 is preset each time power is restored to the system. In a suitable arrangement of power fail circuit 300, this presetting of output Q 308 is accomplished by tying a data input D 304 and a clock signal 306 of flip flop 302 to Vcc. An inverted preset input PR 310 is tied to an RC circuit 312. When a power failure occurs, RC circuit 312 will discharge and inverted preset input PR 310 will fall to ground potential. When power is restored, Vcc pin 307, as well as data input pin 304 and clock pin 306, will rise rapidly to Vcc while inverted preset input PR 310 will be temporarily held to a low voltage level as RC circuit 312 charges capacitor 314 through resistor 316. This sequence will result in a preset of output Q 308. Eventually, when RC circuit 312 has charged, inverted preset input PR 310 will held at a high input level having no further effect on the operation of flip flop 308. Power failure circuit 308 preferably further includes programmable access to inverted clear input 318 to enable programmable clearing of output Q 308. With this configuration, the present invention can query output Q 308 during execution of a boot code sequence that is initiated in response to a boot event. If output Q 308 is set, it is assumed that power has been failed since the immediately preceding boot event. After determining the state of output Q 308, the boot code sequence clears output Q 308 by programmably asserting clear input pin 318. Once cleared, output Q will remain in a cleared state as long as Vcc is applied. In this manner, power fail circuit 308 is indicative of whether a power failure has occurred.

Turning now to FIG. 4, a simplified block diagram of an embodiment of power status indicator 208 is depicted including a power mode indicator 400. Power mode indicator 400 in a presently preferred embodiment includes sufficient power mode bits 402 to uniquely indicate the last known power mode of network client 104. In an embodiment of computer network 100 in which network client 104 can assume, for example, one of four power modes such as the four power modes discussed previously, power mode indicator 400 would preferably include two power mode bits 402a and 402b (collectively identified as power mode bits 402). It will be further appreciated that, because the last known power mode of network client 104 may have preceded an intervening power failure, the power mode bits must be immune to power failures. In the depicted embodiment, this immunity is provided by implementing power mode bits 402 as a plurality of non-volatile memory cells. As will be appreciated to those skilled in the design of integrated circuit memory devices, a non-volatile memory cell can be suitably fabricated by incorporating an extremely thin oxide structure adjacent a floating gate of the device. By appropriately controlling the voltage of a second gate structure and the source and drain terminals of the device to achieve an extremely high electric field across the thin oxide, electrons may be deposited and withdrawn from the floating gate structure by way of well documented tunneling mechanisms. The depositing and withdrawing of charged elements such as electrons from the floating gate can alter the structure from a device that is always off under normal operating voltage conditions to a device that is never off. Moreover, because the floating gate is surrounded by insulating material such as silicon dioxide, the charge present on the floating gate does not dissipate when power is removed from the device. Thus, once programmed, a non-volatile memory cell suitable for use as power mode bits 402 remains programmed despite a loss of power. The present invention contemplates an operating system that is configured for use with network client 104 and the preserving of power mode information. More specifically, the operating system software of network client 104 operates to detect a change in the power mode status of network client 104 and to entering a program/erase routine designed to store a value in power mode bits 402 that conveys the power mode to which network client is transitioning. Thus each modification in power mode status of network client 104 is preceded by an operating system subroutine that erases the previous values stored in power mode bits 402 and programs new values indicative of the new power state. In the depicted embodiment, the relatively high voltages and long pulse widths required to achieve suitable programming and erasing of non-volatile memory bits used for power mode bits 402 necessitates the incorporation of specialized programming/erase circuitry 404 designed to accommodate the programming/erase requirements power mode bits 402.

Thus, in the preferred embodiment, power status indicator 208 includes power fail circuit 300 and power mode indicator 400 thereby providing a mechanism by which network client 104 preserves and conveys information about the power fail history of and the power mode history network client 104. The present invention contemplates a method of utilizing the information in power status indicator 208 to distribute download requests from the various network clients 104 of computer network 100 following a power interruption by scheduling download requests following a power failure based upon a priority scheme assigned to the power information.

FIG. 5 indicates the various permutations of power fail information provided by power fail circuit 300 and power mode information provided by power mode indicator 400 in an embodiment of power status indicator 208 in which network client 104 can assume one of four power modes, namely, ON, SUSPEND, SOFT OFF, and FULL OFF. As indicated in the table, entries 1 through 4 indicate conditions in which a boot event is encountered and the power fail information in column 502 indicates that no power failure has occurred since the immediately preceding boot event. For the power mode conditions ON, and SUSPEND represented in FIG. 5 by entries 1 and 2 respectively, there is no need to initiate a download from network server 102 since system memory 204 still contains any data and operating system downloaded during a previous execution of the boot sequence. More specifically, the ON and SUSPEND states signified by power mode bits 402 indicate power modes in which power and refresh activity are maintained at system memory 204. Moreover, the power fail information indicates that power has been continuously maintained to network client 104 since the last boot event. Under these circumstances, any information downloaded during a previous execution of the boot code sequence should still reside within system memory 104 and the boot code sequence, upon detecting these conditions in power status indicator 208, bypasses any downloading of information. This situation most typically arises when, for example, users of network clients 104 reboot their systems by either activating a reset button of network client 104 or executing a software reboot. In other embodiments, the boot code sequence execution for the situations represented by entries 1 and 2 in FIG. 5 could include an option whereby the user is permitted to specifically initiate a download request for handling situations in which the operating system software has become corrupted and is no longer fully functional even though no power failure has occurred. Entry 3 of the table represents a situation in which client computer 104 was in a SOFT OFF state, but no power failure occurred. This condition is most likely to occur either when the user intentionally places network client in the SOFT OFF state through an appropriate keyboard instruction or when the SOFT OFF state is entered because of a prolonged period in which no input activity is detected. Regardless of the manner in which network client 104 entered the SOFT OFF state, a subsequent boot sequence will require a download of operating system software from network server 102 since the power to system memory 204 of network computer 104 was disabled in the SOFT OFF state. Entry 4 of the table indicates a situation in which the last known state of network client 104 was FULL OFF and the power failure mechanism indicates no power failure. This condition should result in the generation of an error condition or an interrupt because it indicates that the power status indicator is not functioning correctly (i.e., the power mode information indicates that power was previously off but the power fail indicator indicates that power has been continuously present.) Generally speaking, each of the conditions in which the power fail indicator is 0, excluding the disallowed state represented by entry 4, does not raise the concern that a boot storm event is likely to be encountered. In other words, because a boot storm event is associated with the simultaneous response to a power failure by a plurality network clients 104, a power fail indication that no power loss has occurred infers that the network client executing the boot event is likely to be the only such machine generating a boot event at that moment.

Referring now to entries 5 through 8 in the table of FIG. 5, each of these entries represents a condition in which the power fail information indicates that the power has been disrupted since a previous boot event thereby increasing the likelihood of a boot storm because it is probable that all network clients experienced the same power outage and power restoration. Under these circumstances, scheduling or prioritizing of the downloading activity such that the download events for each network client do not occur simultaneously is highly desirable. Utilizing the power mode information provided by power mode indicator 400 and displayed in column 504, the invention schedules or prioritizes the download event as indicated in column 506 based upon an interpretation of the circumstances under which the power was interrupted. With respect to entries 5 and 6 in which the power mode indicator reveals that network client 104 was in the ON and SUSPEND mode respectively, a suitable interpretation that could be given to this condition is that the power failure indicated by power fail information occurred during a time, such as the daytime, when network client 104 was in use. Under this interpretation, the present invention gives the download request a relatively high priority based on the possibility that power was subsequently restored while the user of network client 104 was still at work and that the user will be anxious to access the system after restart. This relatively high priority can be manifested through a variety of scheduling options. In one embodiment, network client 104 can simply unconditionally initiate a download from network server 102 when a boot event occurs and the power fail information matches entries 5 or 6 of the table in FIG. 5. Another embodiment recognizes that the user of network client 104 may not require the immediate use of network client 104 when the power is restored. If, for example, the user has left the office or has moved on to another project or activity not requiring use of network client 104, immediate downloading of boot code data from network server 102 may not be required. To address this possibility, one suitable scheduling option for initiating a download from a system in a condition matching entries 5 and 6 might include prompting the user for input. This option would effectively discriminate between network clients 104 where no user is present at the time power is restored from network clients where the user is still present giving priority to clients where the user is present. For systems in which the lack of a response to the prompt suggests that no user is present, a scheduling option might include randomly generating a delay interval for each network client 104 from which no user response was received and initiating the download requests for each client after expiration of the client's randomly generated delay. This method has the benefits of distributing the download requests over time, restoring network clients to their last known power status, and de-prioritizing download requests for clients from which no user input was received. Another scheduling option suitable for network clients 104 from which no response was received would be to transition each such client to a SOFT OFF status and await a user initiated boot event when the user eventually requires use of the system. This scheduling option has the benefit of conserving system power consumption, but has the drawback of restoring a network client to a power mode that is different from the network client's last known power mode. Entry 7 of the table indicates that a power failure occurred while network client 104 was in SOFT OFF mode, such as might occur when the power failure occurs at night time. One embodiment of the present invention contemplates assigning this condition a relatively low priority since the network client 104 was in a state of inactivity when the power failure occurred. This relatively low priority could be achieved by simply allowing network client 104 to transition to the SOFT OFF mode when power is restored, where the system will await a user initiated boot event. Because it is unlikely that multiple user initiated boot events will be generated simultaneously, this prioritization scheme achieves the benefit of reducing the likelihood of saturating network capacity. This prioritization option also has the benefit of restoring network client to its last known power mode such that the user of network client 104, upon returning to the machine, may well be unaware that the power failure occurred. Finally, entry 8 of the table indicates a condition in which the last known power mode was FULL OFF. In an embodiment of computer network 100, this condition typically occurs only following the initial power on of network client 104 when the power switch is activated. After initial activation, one embodiment of computer network 100 contemplates that each network client 104 will rarely require a FULL OFF state. Thus, entry 8 would indicate not only that the boot event is the initial boot event for network client 104, but also that there is a user physically present at the machine. Under these circumstances, an appropriate scheduling prioritization might assign this condition a relatively high priority by immediately issuing a download from network server 102.*

* Regardless of the specific prioritization scheme that is assigned to each possible power status condition, the invention contemplates interpreting the power status indicator and assigning some prioritization scheme to the information.

It will be apparent to those skilled in the art having the benefit of this disclosure that the present invention contemplates a computer and method for managing boot events in a computer network. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A computer network comprising:
   a network server including a storage medium configured with boot code data;
   a network client including a power status indicator, wherein the network client is configured to query its power status indicator during execution of a boot code sequence initiated in response to a boot event, and further configured to schedule retrieval of boot code data from the network server responsive to detecting a power status indicator state indicative of a power failure associated with the client.

2. The network of claim 1, wherein the power status indicator includes a power fail circuit having a flip flop configured wherein the output of the flip flop is preset when power is restored to the network client after a power failure.

3. The network of claim 1, wherein the scheduled retrieval of boot code data includes a randomly generated delay value.

4. The network of claim 1, wherein the power status indicator includes a power mode indicator indicative of a last known power mode of the network client.

5. The network of claim 4, wherein the power mode indicator comprises at least one nonvolatile memory bit.

6. The network of claim 4, wherein the power mode of the network client is selected from the group comprising ON, SUSPEND, SOFT OFF, and FULL OFF.

7. The network of claim 4, wherein the scheduling of the boot code data retrieval is prioritized based at least in part upon the last known power mode.

8. The network of claim 1, wherein the network client lacks a randomly accessible permanent storage facility.

9. The network of claim 8, wherein the boot code data retrieved from the network server comprises operating system software.

10. A client computer for use in a computer network, comprising:
    a power status indicator; and
    a nonvolatile storage device configured with instructions comprising a boot code sequence, wherein the client computer is operable to execute the boot code sequence in response to a boot event and further wherein the boot code sequence queries the power status indicator and schedules the retrieval of boot code data from a server of the computer network responsive to detecting a power status indicator indicative of a power failure associated with the client computer.

11. The network of claim 10, wherein the power status indicators include a power fail circuit configured to indicate whether power to the client computer has failed since a previous boot event.

12. The network of claim 11, wherein the power fail circuit includes a flip flop configured wherein the output of the flip flop is preset when power is restored to the client computer after a power failure.

13. The network of claim 12, wherein the scheduled retrieval of boot code data includes a randomly generated delay value.

14. The network of claim 10, wherein the power status indicator includes a power mode indicator indicative of a last known power mode of the client computer.

15. The network of claim 14, wherein the power mode indicator comprises at least one nonvolatile memory bit.

16. The network of claim 14, wherein the power mode of the client computer is selected from the group comprising ON, SUSPEND, SOFT OFF, and FULL OFF.

17. The network of claim 14, wherein the scheduling of the boot code data retrieval is prioritized based at least in part upon the last known power mode.

18. A method of operating a network client, comprising:
   executing a boot code sequence in response to a boot event;
   querying a power status indicator as a portion of the boot code sequence;
   scheduling a retrieval of boot code data from a network server responsive to detecting a power status indicator state indicative of a power failure associated with the client; and
   retrieving the boot code data from the network server at the scheduled time and storing the boot code data in a system memory of the network server.

19. The method of claim 18, wherein the boot event is selected from the group comprising a LAN wakeup event, a reset event, and power on event.

20. The method of claim 18, wherein the step of querying the power status indicator comprises querying a power fail circuit configured to indicate if the network client has experienced a power fail since a previous boot event.

21. The method of claim 20, wherein the boot code sequence includes clearing the power fail circuit after the querying of the power fail circuit.

22. The method of claim 18, wherein the step of querying the power status indicator comprises querying a power mode indicator configured to indicate a last known power mode of the network client.

23. The method of claim 22, wherein the scheduling of the boot code data retrieval is prioritized based at least in part upon the last known power mode.

24. The method of claim 18, wherein the scheduling of the retrieval of boot code data includes requesting a prompt from a user of the network client.

25. The method of claim 18, wherein the scheduling of the retrieval of boot code data includes creating a randomly generated delay interval.

* * * * *